Nov. 2, 1971    A. J. FLECKENSTEIN    3,616,820
SOFTENER VALVE

Filed Feb. 13, 1970    9 Sheets-Sheet 1

Fig.1.

Inventor
Andrew J. Fleckenstein
By
Mann, Brown & McWilliams.
Attys.

Nov. 2, 1971 A. J. FLECKENSTEIN 3,616,820
SOFTENER VALVE
Filed Feb. 13, 1970 9 Sheets-Sheet 4

Inventor
Andrew J. Fleckenstein
By
Mann, Brown & McWilliams
Attys.

Nov. 2, 1971  A. J. FLECKENSTEIN  3,616,820
SOFTENER VALVE

Filed Feb. 13, 1970  9 Sheets-Sheet 7

Inventor
Andrew J. Fleckenstein
By Mann, Brown & McWilliams
Attys.

United States Patent Office 3,616,820
Patented Nov. 2, 1971

3,616,820
SOFTENER VALVE
Andrew J. Fleckenstein, 2880 Santa Marin Drive,
Brookfield, Wis. 53005
Continuation-in-part of application Ser. No. 764,178,
Oct. 1, 1968. This application Feb. 13, 1970, Ser.
No. 11,071
Claims priority, application Switzerland, Sept. 30, 1969,
14,721/69
Int. Cl. G05b 19/06
U.S. Cl. 137—624.13
27 Claims

ABSTRACT OF THE DISCLOSURE

A water softening valve and timing mechanism which is formed to provide a short stroke of an operating piston in the valve and formed so that once actuation of the valve is started, the piston moves continuously through several positions for backwash, regeneration, etc., continuously until the entire conditioning cycle is completed.

This application is a continuation-in-part of my copending application, Ser. No. 764,178, filed on Oct. 1, 1968, and now abandoned.

The present invention is directed to new and useful improvements in water softener valves of the type which are motor driven and which are controlled by a timing motor.

The major purposes of the present invention are to so form a water softener valve that a relatively short stroke piston may be used in the valve with resulting economies in the cost of the valve, to so arrange a drive motor and timing system for the valve along with passages within the valve that the movement of the operating piston, once started, is continuous in moving slowly thorugh various positions necessary for backwashing, regeneration, and filling the brine tank, and to so form water softener control valves of this type with timing mechanism which utilizes relatively few operating switches and other mechanisms to thereby allow production of automatic softening valves at low cost, these and other purposes being more apparent in the course of the ensuing specification and claims when taken with the accompanying drawings, in which:

Like elements are designated by like characters throughout the specification and drawings.

Figure 1:
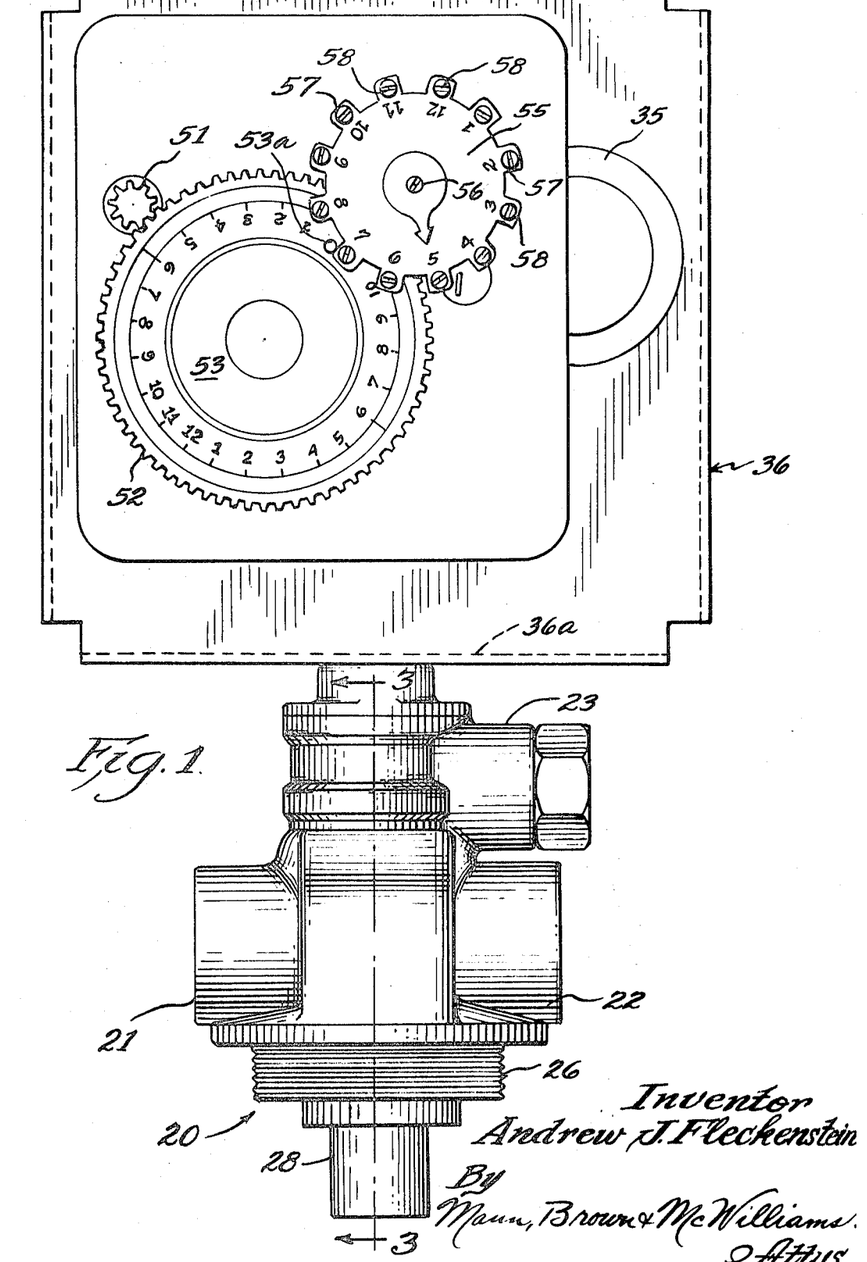
FIG. 1 is a front view of a typical water softener valve and timing motor mechanism incorporating the principles of the present invention.
Figure 2:
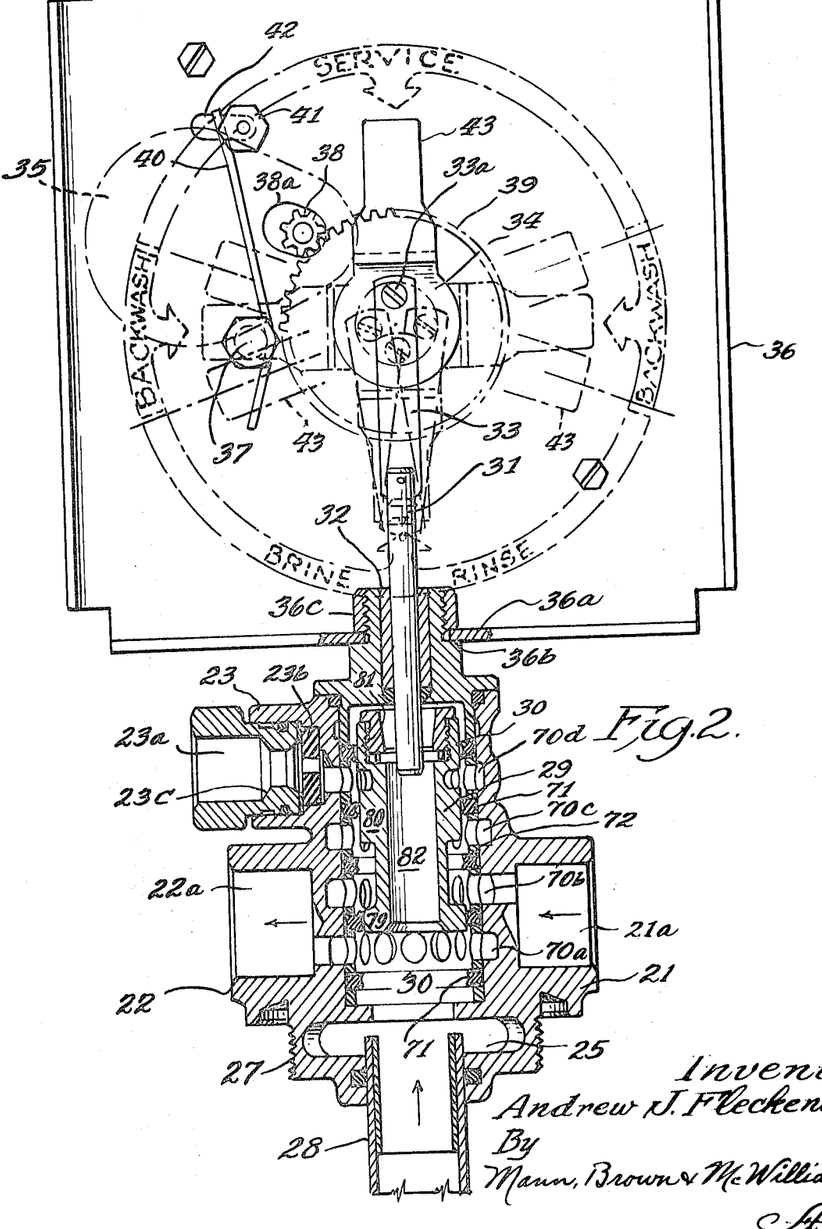
FIG. 2 is a back view of the mechanism illustrated in FIG. 1 and with the valve body proper being illustrated in section and in the normal service position for purposes of understanding the invention.
Figure 3:
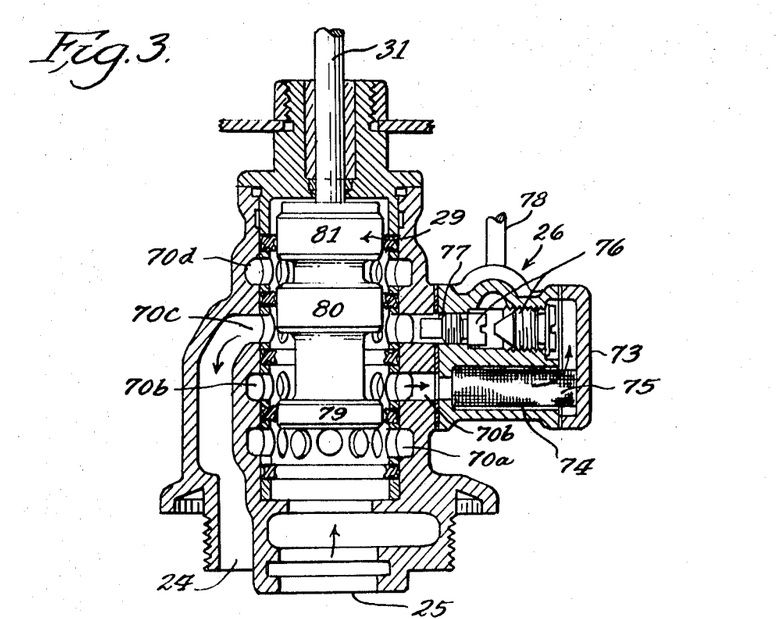
FIG. 3 is a sectional view of the valve illustrated in FIGS. 1 and 2 taken along the section lines 3—3 of FIG. 1.

With specific reference now to the drawings and in the first instance to FIG. 1, the numeral 20 generally designates a water softening valve body. The valve body, as will be appreciated from FIGS. 1, 2 and 3, is formed so as to have an inlet conduit fitting 21 through which an inlet passage 21a is formed, an outlet conduit fitting 22 through which an outlet passage 22a is formed, a conduit fitting 23 through which a drain port passage 23a is formed, first and second tank connecting passages 24 and 25 and an aspirator generally designated at 26. The drain passage 23a has a flow restricting washer 23b, which is held in position by a conduit connecting plug 23c. Flow restrictor 23b serves to keep the interior of the valve pressurized when drain passage 23a is connected to one of the tank passages. This keeps softening material from rising from the bed in the softener tank. Aspirator 26 is adapted to be connected to a brine or regenerating material tank. The valve body has screw threads 27 formed at a lower end thereof so as to enable the body to be threaded into the top opening of a water softener tank. One of the tank passages from the valve, as for example passage 25, is connected to a pipe 28 which extends to the bottom of a water softener tank while the passage 24 is open to the top of the water softening tank. In valves of this type, hard water from a supply line is delivered from the valve to the top of the tank where it flows downwardly through conventional water softening material for softening of the water and the flow is then directed upwardly through a pipe for redelivery to the valve and thence to the outlet of a normal house or other building water supply line.

The valve is a piston type valve in which a piston 29 is axially moved along the axis of a central bore in the valve and through which the various passages selectively communicate with one another depending upon the position of piston 29. Piston 29 is connected through a pivotal connection designated generally at 30 and of the type shown in copending application Ser. No. 529,027, filed Feb. 21, 1966, in the names of Andrew J. Fleckenstein and Lambert W. Fleckenstein, now Pat. No. 3,482,604. Piston rod 31 is slidably mounted in a bearing 32 in the end of the valve body opposite to the tank connecting end and is adapted to be reciprocated by a connecting link 33 which is pivotally mounted by means of pin 33a on a crank arm which is shown in the form of a wheel 34.

In order to rotate crank arm 34 when desired, a drive motor and step down gear assembly 35 is mounted on a drive motor and timing motor mechanism frame 36 as by means of a pivot pin 37. The motor may be pivotally mounted as shown.

The timing motor and drive motor frame may be fixed to the upper end of valve body 20 as by fixing the lower wall 36a of the frame to a shoulder 36b of the valve body and holding the frame in the position illustrated through use of nut 36c which is threaded on the reduced upper end of the valve body and which bears against the lower wall of the frame 36.

The valve motor drive and transmission 35 includes an output pinion 38 which is adapted, when the drive motor is in the position illustrated in FIG. 2, to engage driven gear 39 which is fixed to and rotates with the crank arm 34. Pinion 38 extends through an aperture 38a in the upstanding portion 36b of the frame.

The drive motor and gear transmission 35 may be swingably mounted on pivot pin 37 and normally held in the operative position illustrated in FIG. 2 through use of a spring arm 40 which is mounted on pin 37 and which engages a lug 41 carried by the motor and gear transmission so that the spring 40 urges the motor and gear transmission to the operative position illustrated in FIG. 2. Lug 41 extends through an arcuate aperture 42 formed in one upstanding portion 36b of frame 36 so as to limit the amount of swinging movement in a counterclockwise direction as seen in FIG. 2 to the dotted line position illustrated in FIG. 2.

The swingable mount of the motor and gear transmission enables the motor and gear transmission to be moved to the dotted line position in FIG. 2 to thus take pinion 38 out of engagement with gear 39 whereupon the crank arm 34 may be cycled manually as by manually actuating the extended arm 43 which is fixed to the crank arm 34. Such manual cycling of the valve is desirable during servicing operations when the operator or service man desires to move the valve rapidly through its various positions in order to pinpoint any particular trouble in the valve. Also, this particular mechanism enables a person to quickly shift the valve into a regenerating or backwashing portion of the cycle at any time if it is desired to do so.

The swingable mounting of the drive motor and gear transmission 35 also enables the drive motor to swing away from gear 39 in the event of an overload and thus break the drive.

Figures 4, 6, 8:
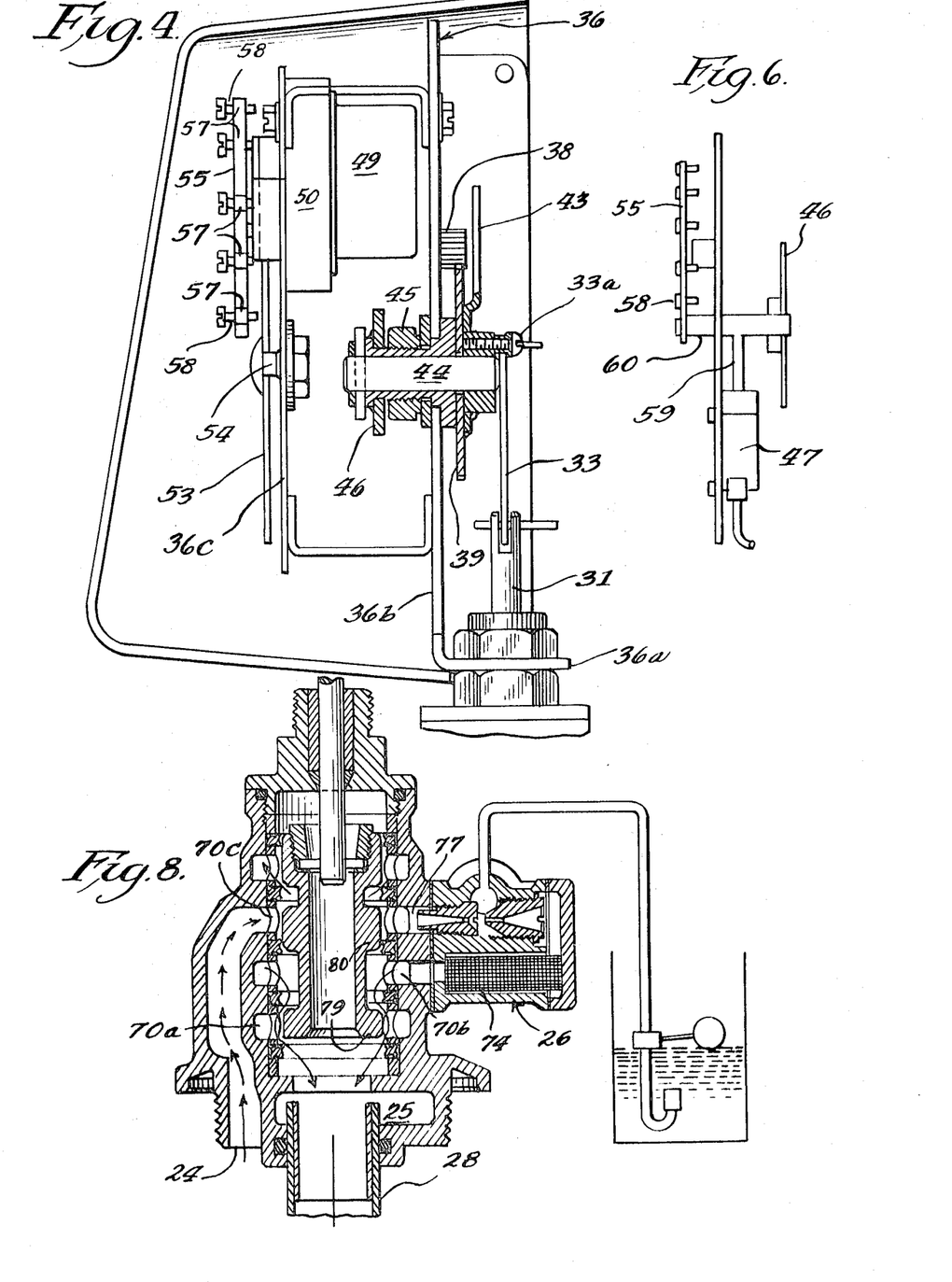
FIG. 4 is a side view of the timing and drive motor mechanism illustrated in FIGS. 1 and 2.
FIG. 6 is a view of a switch and operating arm assembly utilized in the invention.
FIG. 8 is another sectional view of the valve in the position of FIG. 7.

As will be noted particularly in FIG. 4, crank 34 is fixed to a drive shaft 44 which is rotatably mounted in a bushing 45 carried by the upstanding main portion 36b of the frame. The driven gear 39 is fixed to drive shaft 44 for rotation with the crank 34 as by means of a suitable key and keyway connection. As will be noted in FIG. 4, the shaft 44 extends through the upstanding portion 36b of the supporting frame and the shaft 44 carries a control cam 46. Cam 46 is adapted to cooperate with a control switch 47 for the motor and transmission 35. When switch 47 is closed, the drive motor and transmission mechanism is energized to thus rotate crank 34 and shift the piston 29 for the control valve through the various operating positions of the valve.

A timing motor mechanism is carried by the frame 36 for causing periodic actuation of switch 47 and consequent energization of the motor and transmission assembly 35. The timing motor mechanism includes a timing motor 49 having a step-down gear transmission 50 coupled therewith and mounted on the portion 36b of the frame. The transmission 50 includes an output pinion 51 which engages an annular gear 52 on a time of day wheel 53. The speed of rotation of the timing motor and the gear ratios are such that time of day wheel 53 is rotated one revolution every 24 hours. The time of day wheel may carry appropriate indicia on the face thereof as indicated in FIG. 1 for indicating the particular hour of the day. Time of day wheel 53 is journaled for rotation on a forwardly projecting portion 36c of the frame as by means of an axle 54.

A skip day wheel 55 is mounted for rotation on an axle 56 which is fixed to the forwardly projecting portion 36c of the frame 36. Wheel 55 is adjacent to wheel 53 and a portion of it overlies a portion of wheel 53. The skip day wheel has a plurality of spaced lugs 57 on the periphery thereof. Lugs 57 are equally spaced about the axis of the skip day wheel. The skip day wheel may have a size and number of lugs such as to provide a twelve day cycle in which case twelve different lugs are provided as indicated in FIG. 1. Each of the lugs carries a detachable pin 58 which projects inwardly through the wheel 55 and toward the frame portion 36c. Skip day wheel 55 is adapted to be rotated through a portion of a revolution every 24 hours as by means of a pin 53a which is carried by the time of day wheel 53 in a position to contact one of the lugs and move it in a counterclockwise direction as seen in FIG. 1.

Figure 5:
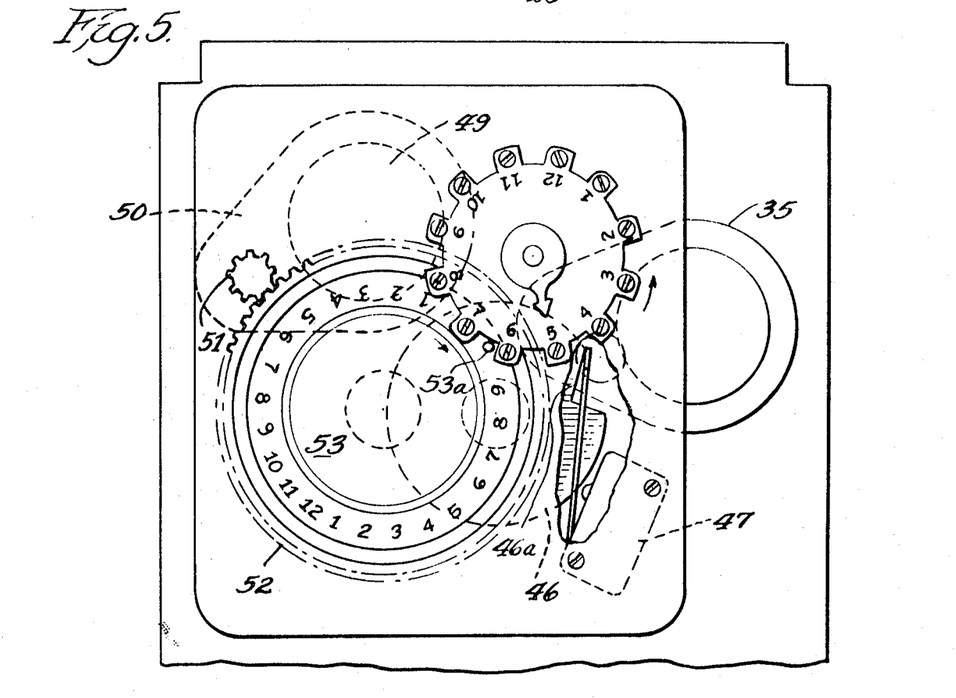
FIG. 5 is a front view of the timing and drive motor mechanism illustrated in FIGS. 2 and 4 with certain portions cut away to illustrate certain elements.

Switch 47 has an actuating arm 59. Actuating arm 59 is more or less T-shaped as is seen in FIG. 5 and includes extended lateral portions 60 and 61 adapted for contact with one of the pins 58 and the opposed surface of cam 46 respectively. The arrangement is such that when time of day wheel 53 rotates to a position where lug 53a contacts one of the lugs 57 and causes a partial revolution of skip day wheel 55, one of the pins 58 will then contact arm portion 60 and close switch 47, thereby energizing the valve drive motor 35. Lugs 57 and pins 58 provide what are in effect clutching elements between the time of day wheel and the switch 47.

Cam 46 includes a cutaway portion 46a in one peripheral portion thereof. In a normal inactive position of the drive motor 35, portion 61 rests in this cutaway portion of cam 46 and drive motor 35 is deenergized. However, when arm portion 60 is contacted by one of the pins 58, actuating arm 59 closes switch 47 and motor 35 commences a slow shifting movement of the valve piston 29 along with rotation of cam 46. The arrangement of elements is such that the pin 58 engaging arm portion 60 will hold the switch 47 closed until the pin 58 passes over the end of the arm portion 60 during rotation of the skip day wheel. The interval of time required for pin 58 to pass over actuating arm portion 60 is slightly greater than the time required for the cutaway portion 46a of cam 46 to move away from the arm portion 61, whereupon arm portion 61 engages the main periphery of cam 46 and holds switch 47 closed after the pin 58 has passed out of engagement with arm portion 60. Thus switch 47 will remain closed and valve drive motor 35 will continue running through one complete revolution of cam 46 and crank 34, whereupon actuating arm portion 61 again drops into the cutaway portion of the cam 46 and opens switch 47. This stops motor 35. Switch 47 then remains open until the pin or lug 53a has passed through a complete revolution and again contacts one of the lugs 57.

When all of the lugs 57 carry the actuating pins 58, the valve drive motor and transmission 35 will be energized every 24 hours to cause a complete revolution of cam 34. However, if one or more of the pins 58 are detached from their associated lugs, partial rotation of skip day wheel 55 will simply cause an appropriate lug to pass actuating arm portion 60 without closing switch 47. Thus, the drive motor and transmission 35 may be set so that it may be energized once each day or may be energized for 11 out of 12 days or any selected number of days represented by the number of lugs on the skip day wheel 55.

It should be understood that the crank 34 for the valve piston is moved very slowly by the drive motor and transmission 35. In a typical arrangement, the drive motor may be set so that approximately 180 minutes of time is required for one revolution of the crank 34. In a typical water softening cycle this may provide approximately 15 minutes of backwash time, approximately 55 minutes of brine and rinse time, and approximately 15 minutes of additional backwash or rinsing time. It may be noted that operation of the crank 34 produces a continuous slow movement of the valve operating piston from the service position, and through the several regenerative positions, followed by return to the service position.

In lieu of the time motor and drive arrangement herein illustrated and described, a timing motor and driving mechanism of the type illustrated in copending application Ser. No. 671,825, filed in the United States Patent Office on Sept. 29, 1967, in the name of Andrew J. Fleckenstein, now Pat. No. 3,457,792, may be utilized to drive the crank 34.

The valve body is arranged so that the piston has a relatively short operating stroke and arranged so that the piston will control the flow through the valve, tank and into the service outlet during slow movement of the piston over the relatively large time period as previously described. The valve body is formed so as to provide a plurality of equally spaced grooves or annular passages 70a, 70b, 70c and 70d along the axis of the valve bore. The areas between these grooves or passages 70 carry quadrings 71 which are held in position by spacer rings 72. The spacer rings extend between the quadrings and hold them in equally spaced positions with the inner lobes of the quadrings projecting inwardly in the manner described in U.S. Pat. No. 3,249,122, issued May 3, 1966, to Lambert W. Fleckenstein and Andrew J. Fleckenstein. The arrangement is such that the wall of the piston 29 may engage the inner lobes of the quadrings to provide a sealing relation for the space between two adjacent quadrings while providing considerable clearance space between the wall of the piston and the spacer rings. The clearance space is advantageous in allowing particles of grit, dirt or the like to pass through the valve without jamming the valve. At the same time this clearance space allows the piston to more or less float on the resilient support provided by the quadrings. The rings may take the form of the seal rings described in U.S. Pat. No. 3,347,556, issued Oct. 17, 1967, to Lambert W. Fleckenstein and Andrew J. Fleckenstein.

The annular grooves 70a, 70b, 70c and 70d define flow passages which are connected respectively to the outlet passage 22a, inlet passage 21a, and tank passage 24, and drain passage 23a. The arrangement is such that the outlet and inlet passages 70a and 70b, respectively, are adjacent to one another while the outlet passage 70a is between the inlet passage 70b and the tank connecting passage 25 which leads to the bottom of the softener tank. The inlet passage 70b is adjacent to the other tank connecting passage 70c while the tank connecting passage 70c is adjacent to the drain passage 70d.

The aspirator 26 is formed as a separate body 73 which may be bolted to the valve body. The aspirator includes a first water feed passage 74 which contains a filter 75. This passage 74 is aligned with and communicates with the inlet passage 70b. The aspirator also includes venturi elements 76 positioned in a second passage 77 which is aligned with and in communication with passage 70c. The aspirator 26 includes a fitting for a conduit 78 which leads to a brine or regenerating solution tank. The arrangement is such that when water pressure is supplied to passage 74 against a reduced pressure in passage 77, the water flow will create a suction on conduit 78 through the venturi elements 76 in a manner known to the art. This suction draws brine from a brine tank and feeds it into the passage 70c. On the other hand, when pressure conditions are balanced in the passages 74 and 77, no flow takes place except for feeding water through conduit 78 to the brine tank. A float valve closes the conduit 78 when the brine tank is full, in a manner known to the art. When this float valve is closed, the balanced pressure conditions in the passages 74 and 77 prevent flow through the aspirator.

Piston 29 is shaped so as to provide axially spaced sealing lands 79, 80 and 81 which cooperate with the seal rings 71 to divide the valve bore into separate flow spaces. These lands 79, 80 and 81 are spaced so as to define grooves therebetween. The spacing of the middle land 80 from the end land 79 is greater than the spacing of adjacent seal rings along the bore and greater than the spacing between centers of adjacent flow grooves as, for example, by reference to grooves 70b and 70c in FIG. 2. The spacing is less than the distance between three adjacent seal rings. The groove between the middle land 80 and the end land 81 is slightly greater than the axial width of a seal ring, as will be appreciated in FIG. 8.

Piston 29 includes a flow passage 82 formed through the interior thereof and from end to end. This is for the purpose of allowing selective communication between the tank and the drain port 23 during the regenerating cycle of the valve.

When the timer unit calls for a regenerating cycle, motor 35 is energized so as to slowly rotate the crank arm 34 through one complete revolution. When the motor 35 is energized, crank arm commences rotation in one direction, as for example clockwise in FIG. 2, and this starts the piston 29 moving from the normal stationary service position illustrated in FIGS. 2 and 3 toward the position illustrated in FIGS. 7 and 8 which are a backwashing position of the valve. In the normal service position of the valve, inlet port 21a communicates through passage 70b, through the piston space between lands 79 and 80 with passage 70c which leads to the top of the softening tank. Water then flows downwardly through the softening tank and through the bed of water softening material in the tank so as to soften the same in a well known fashion. Softened water is then removed from the bottom of the tank through pipe 28, through the lower end of the valve bore, passage 70a, and to the service outlet passage 22a. In this service position piston lands 80 and 81 close off the drain port 23a to the remainder of the flow passages in the valve. Also, in this service position inlet passage 70b is in communication with aspirating passage 74 as well as the passage 77 but this produces no action in the aspirator since pressure conditions are then balanced and the valve for brine conduit 78 is closed.

Figures 7, 9, 10:
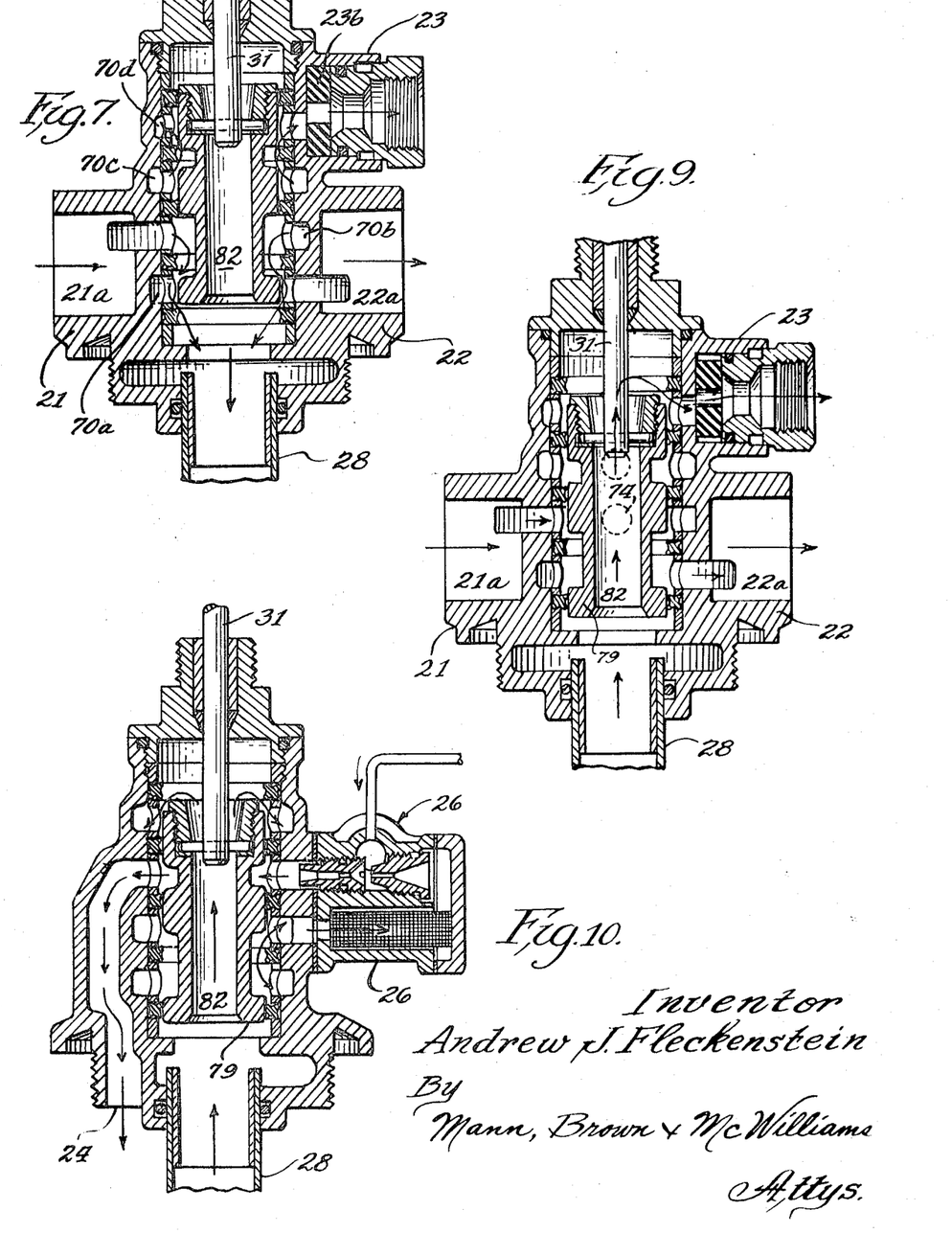
FIG. 7 is a sectional view of the valve illustrating a backwash position of the valve.
FIG. 9 is a sectional view of the valve in a brine and rinse position.
FIG. 10 is another sectional view of the valve in the position of FIG. 9.

The valve remains in the service communicating position for a small increment of movement of the valve toward the position illustrated in FIGS. 7 and 8. When land 79 breaks the seal between the passages 70a and 70b, the inlet and outlet passages are in communication with one another so as to continue to supply water, even though hard, to the normal service outlet. Water from the inlet also flows around the end piston land 79 and to pipe 28 for a backwashing operation. The flow through the tank is then in a reverse direction from normal. During the backwashing positions of the valve, piston land 80 seals against the seal ring between the inlet passage 70b and the tank connecting passage 70c. Tank connecting passage 70c is then placed in communication with the drain passage 70d through the space between the lands 80 and 81. At this position it may be noted that the aspirating passage 74 is still in communication with the inlet passage 70b but the pressure therein is balanced against the pressure in passage 70c. In this regard, flow restrictor 23b helps to maintain this balanced pressure condition.

The backwashing operation continues until valve land 79 seals against the seal ring between the outlet passage 70a and the tank connecting passage 25. When land 79 seals against that ring, land 81 also seals against the seal ring between the tank connecting passage 70c and the drain port connecting passage 70d. When these two seals are established, the valve is in a brine and rinse position as illustrated in FIGS. 9 and 10. As long as these seals are maintained during the continuous movement of the valve piston, inlet 21 remains in communication with the service outlet 22. Inlet passage 21 is also in communication through the groove or passage 70b with the aspirating passage 74. Land 80 at this time seals off the passages 74 and 77 from one another. A pressure drop exists across the passages 74 and 77 and inlet water then flows through the aspirating elements 76 to create a suction on brine tank connecting line 78 to draw brine or other regenerative solution through the conduit 78. This flow of brine is then directed through passages 70c and 24 to the top of the tank to regenerate the material in the softener tank. This flow of regenerative solution passes through the tank and to pipe 28 and through the internal piston passage 82 to the drain passages 70d and 23a. This flow continues until the supply of brine is exhausted, whereupon water from the inlet will simply flow through the aspirating element 76 and through the tank connecting passages 70c and 24 for a rinsing operation. This rinse water flows through the pipe 28 and through the internal piston passage 82 to the drain.

The valve piston is at its lowermost positions, as seen in the drawings (FIGS. 9 and 10), during this brine and rinse operation. When the crank arm 34 passes 180° of rotation, it commences to move valve piston 29 back toward the normal service position illustrated in FIGS. 2 and 3. The rinsing operation will continue until the valve land 79 moves away from its sealing relation with the seal ring between outlet passage 70a and the tank connecting passage 25a. The inlet 21 remains connected to outlet 22 but some inlet water is then diverted to pipe 28. Upward flow through pipe 28 ceases and the brine flow also ceases.

Figure 11:
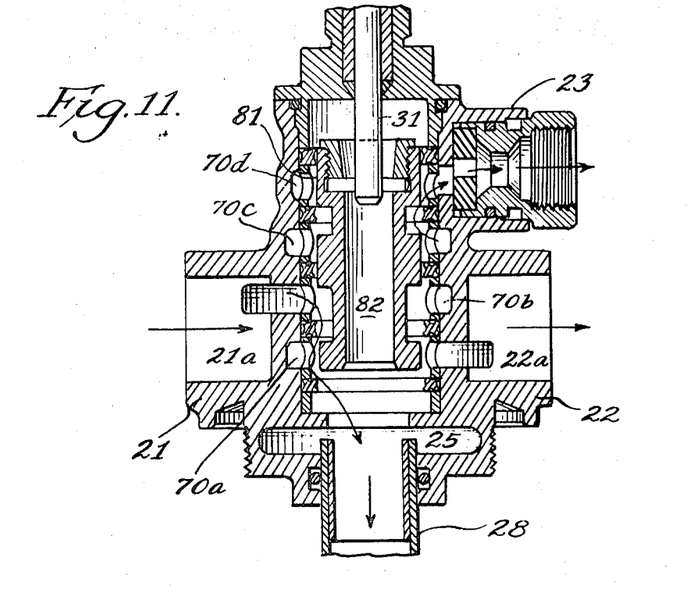
FIG. 11 is another sectional view of the valve in a final backwash or rinsing position.
Figure 12:
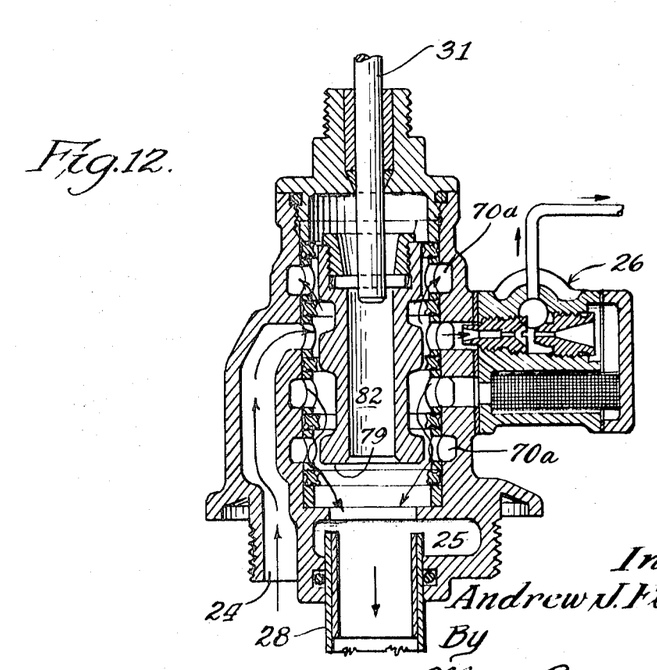
FIG. 12 is another sectional view of the valve when in the position of FIG. 11.

Shortly after the time that this seal is broken, land 81 moves away from its sealing relation with the ring between the tank passage 70c and the drain passage 70d, and flow through the tank is again reversed. This position is illustrated in FIGS. 11 and 12. At this time, the inlet 21 is still in communication with the service outlet 22. The inlet passage 70b is in communication with the bottom of the tank through pipe 28 by flow around the end piston land 79. The top of the tank is in communication through passage 70c with the drain passage 23a by flow through the space between piston lands 80 and 81. Also, at this time, the inlet is in communication with the aspirating passage 74 and the aspirator passage 77 is in communication with the tank connecting passage 24 but the pressure in passage 70c is at least equal to the pressure in the passage 74 so that hard water may flow through the brine tank connecting conduit 78 to refill the brine tank until flow is stopped by means of a float valve or the like in the brine tank.

During this movement of the valve between the positions illustrated in FIGS. 9 and 10 and the positions in FIGS. 2 and 3, the passages will stay in the communicating relation illustrated in FIGS. 11 and 12. When the passages are in the communicating posiiton illustrated in FIGS. 11 and 12, a second backwashing or rinsing operation takes place in the softening tank and the rinse water is simply carried to the drain.

This final backwashing or rinsing operation will continue until valve land 79 seals against the seal ring between the inlet passage 70b and the outlet passage 70c. At this time, valve land 80 closes off the drain port to the remainder of the passages in the valve.

By positioning the various ports and piston in the manner disclosed, a relatively short operating stroke is required in the piston. This is facilitated by utlizing the lower portion of the crank revolution for the brine and rinse positions of the valve. A relatively short operating stroke enables relatively small and compact bodies. At the same time the short stroke and slow continuous movement of the piston enables use of relatively inexpensive and low power drive motors.

Figures 13, 14, 15:
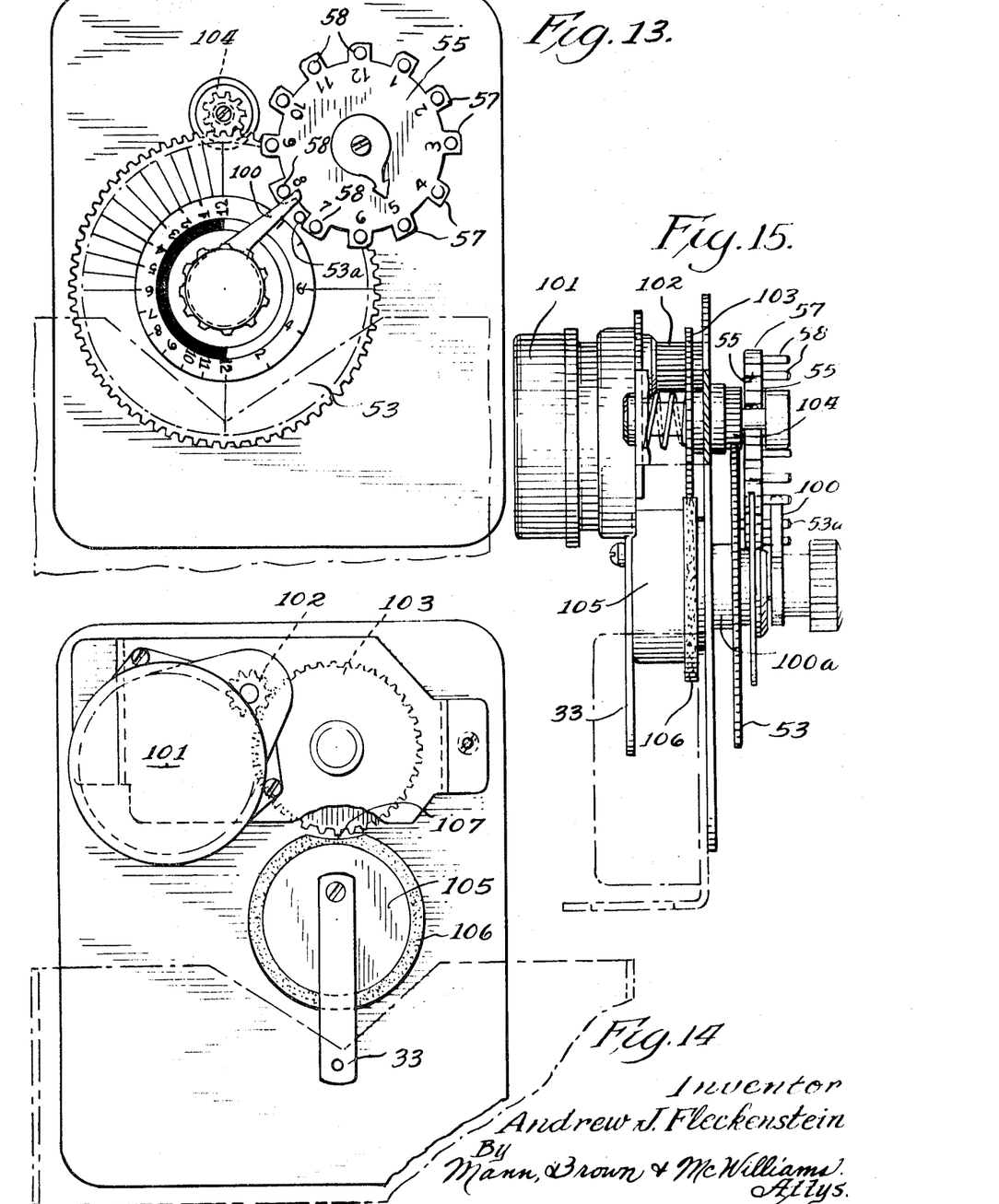
FIG. 13 is a front view of another valve timing motor and drive mechanism.
FIG. 14 is a rear view of the mechanism of FIG. 13.
FIG. 15 is a sectional side view of the mechanism of FIGS. 13 and 14.

FIGS. 13, 14 and 15 illustrate a variant form of driving arrangement for reciprocating the valve piston to the brine and rinse position described herein and for return to a normal service position. In these figures, a time of day wheel 53 is similar in all respects to the time of day wheel in FIGS. 1 and 4 and includes an actuating pin 53a. A skip day wheel 55 is similar to the skip day wheel 55 in FIGS. 1 and 4 and has the characteristic lugs 57 and spaced pins 58. In FIGS. 13, 14 and 15 the pins 58 of the skip day wheel are adapted to contact an arm 100 which extends radially from the time of day wheel 53. Arm 100 is in overlying relation to the skip day wheel. Arm 100 is supported for rotation in a bearing assembly 100a illustrated in FIG. 15 for rotation independently of rotation of time of day wheel 53. Drive motor 101 has a step-down gear transmission which includes an output pinion 102 which drives a driven gear 103. Driven gear 103 is mounted for rotation with a small gear 104 which drives the time of day wheel 53. Gear 103 is mounted generally coplanar with and adjacent to a crank 105 for the valve piston. Motor 101 is a continuously running timing motor so as to continuously rotate time of day wheel 53 through one revolution each twenty-four hours. In these figures the crank 105 for the piston rod connecting link 33 is in the form of a wheel having a rubber or rubberlike resilient peripheral surface 106. A gap 107 is formed in this surface at a depth such that when the gap 107 is opposed to the gear 103, gear 103 rotates without causing rotation of the crank 105. However, when crank 105 is rotated through a partial revolution which, for example, may be on the order of 20° to 30°, the teeth of the gear 103 contact the peripheral rubberlike surface and rotate the crank 105 through one complete revolution until the gap 107 is again opposed to the gear. This complete revolution of crank 105 causes the piston of the valve to move through a regenerating cycle. The arrangement of the gears and size of the crank 105 is such that this complete revolution will take place over a period of approximately three hours for the water softening cycle previously described.

Shifting movement of crank 105 to bring about a driving engagement with gear 103 is accomplished when the pin 53a of the time of day wheel contacts one of the lugs 57 of the skip day wheel 55 and causes a partial revolution of the skip day wheel. This causes engagement between one of the pins or lugs 58 and the actuating arm 100. Actuating arm 100 then shifts the crank 105 through a partial revolution necessary to bring about engagement between gear 103 and the surface 106. Motor 101 then drives the crank 105 through the remainder of a complete revolution until gap 107 is again opposed to the teeth of the gear, thereby stopping the engagement. At this time, arm 100 is again positioned between two adjacent pins 58 on skip day wheel 55 in position for contact and shifting movement in response to contact between the pin 53a and one of the lugs 57 which happens when time of day wheel 53 has made another complete revolution. The use of a small timing motor for directly driving the valve directly is facilitated by the short stroke valve arrangement previously described.

Figure 16:
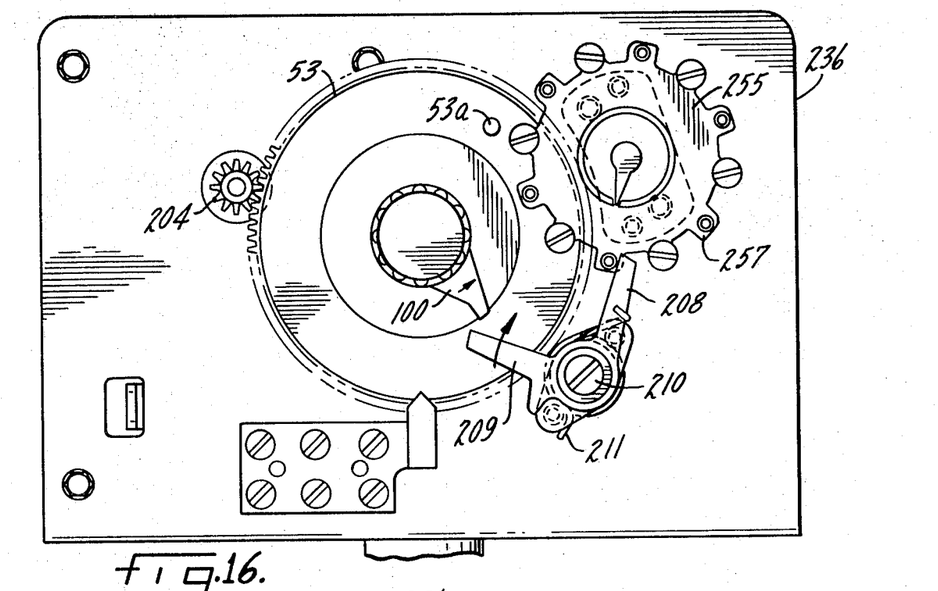
FIG. 16 illustrates a modified form of timing motor drive for water softener valves illustrated in FIGS. 1–5.
Figure 17:
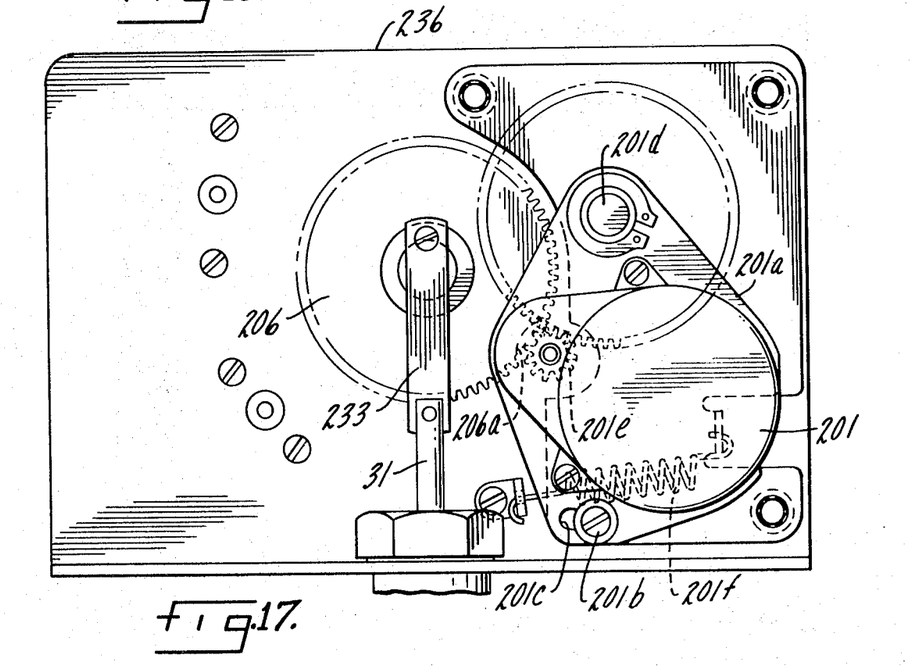
FIG. 17 is a rear view of the drive illustrated in FIG. 16.

FIGS. 16 and 17 illustrate a timing motor mechanism having principles similar to those disclosed in FIGS. 13–15, inclusive, in that a timing motor is used to both rotate the time of day wheel and drive the valve piston through the successive regenerating positions heretofore described.

In FIGS. 16 and 17, the valve body and piston structure are exactly the same as that disclosed in FIGS 1–15, inclusive, and the mechanism is adapted to slowly and continuously move the piston through the successive regenerating positions as heretofore disclosed. In FIGS. 16 and 17 time of day wheel 53 is adapted to be continuously rotated once every twenty-four hours by a pinion 204. The time of day wheel is mounted on a support 236. An actuating arm 100 is in overlying relation to the time of day wheel and mounted for rotation concentrically therewith but independently thereof, as is the case with actuating arm 100 in FIGS. 13–15. Pinion 204 is continuously rotated by a synchronous timing motor and transmission assembly 201 adapted to rotate time of day wheel 53 once every twenty-four hours. A skip day wheel 255, similar in all respects to wheel 55 in FIGS. 1–15, is mounted on the support 236 in overlying relation to the time of day wheel 53. An actuating lug 53a is fixed to the time of day wheel 53 and rotates therewith for engagement with one of the lugs 257 of the skip day wheel as is the case with the actuating lug 53a in FIGS. 1–15. In FIGS. 16 and 17, the timing motor and transmission assembly 201 is fixed to a plate 201a which is mounted for limited swinging movement as limited by the pin 201b which is fixed to the support 236 and which extends through a slot 201c in the plate 201a. The plate 201a is adapted for swinging movement about pivot 201d which is fixed to the support 236. The pivot is coaxial with the pinion 204 so that pinion 204 remains in engagement with time of day wheel 53 irrespective of swinging movement of the motor and transmission assembly. The motor and transmission assembly includes a second pinion 201e which is spaced from pivot 201d and which is adapted for engagement with a gear 206 which is concentric with arm 100 and fixed for movement therewith as is the case with the wheel 105 in FIGS. 13–15. Gear 206 has a connecting link 233 connected to a hub thereof on an axis eccentric to the axis of gear 206. This connecting link is adapted to reciprocate the piston rod 31 of the valve. Gear 206 includes an arcuate cut-out portion 206a in the periphery thereof so that when pinion 201e is in the position illustrated in FIG. 17 gear 206 remains idle. A spring 201f biases the gear and transmission assembly 201 in a clockwise direction, as viewed in FIG. 17, and toward a position where pinion 201e may drivingly engage the teeth of gear 206 except when the pinion 201e is opposed to the gap 206a.

The spring mounting of the gear and transmission assembly allows the pinion 201e to move away from the teeth of gear 206. When the teeth are frontally opposed and not in proper position for meshing, pinion 201e continues its slow rotation until it may properly mesh with the teeth in gear 206 whereupon the spring 201f biases the pinion into continuous engagement with the teeth of gear 206.

In FIGS. 16 and 17 a different arrangement is used for shifting actuating arm 100 so as to shift gear 206 through a partial revolution to move the gap 206a away from a position opposed to pinion 201e. In FIGS. 16 and 17, for example, a bell crank lever has one arm 208 adapted for engagement with an opposed one of the lugs 257 of the skip day wheel, and another arm 209 adapted to engage actuating arm 100 and shift gear 206 through a partial revolution. The bell crank lever is pivotally mounted on the support 236 as at 210. A torsion spring 211 may surround the pivot axis and engage the arms 208 and 209 to bias the lever towards the neutral position illustrated in FIG. 16 where it is out of contacting relation to arm 100.

The operation of the mechanism of FIGS. 16 and 17 is similar to that of the embodiment described in FIGS. 13 and 14. The timing motor and gear transmission assembly 201 continuously rotates time of day wheel 53 once every twenty-four hours. Once every twenty-four hours lugs 53a moves into contacting relation with one of the lugs 257 of the skip day wheel so as to shift the skip day wheel through a partial revolution. When so moved, one of the lugs 257 of the skip day wheel actuates the bell crank lever arm 203 to move arm 209 clockwise as seen in FIG. 16, to thereby shift actuating arm 100 through a partial revolution and thereby shift gear 206 through a partial revolution necessary to move the gap 206a away from pinion 201e. When pinion 201e engages the teeth of gear 206, gear 206 is driven slowly and continuously through one complete revolution, until gap 206a is again opposed to pinion 201e. This full revolution of gear 206 reciprocates the value piston through one complete regenerative cycle as described previously. With one full revolution of gear 206, gap 206a is again opposed to pinion 201e, rotation of gear 206 ceases, and arm 100 is again positioned to be contacted by the arm 209 of the bell crank lever when the time of day wheel 53 moves lug 53a sufficiently to again contact the skip day wheel and cause actuation of the bell crank lever.

Figure 18:
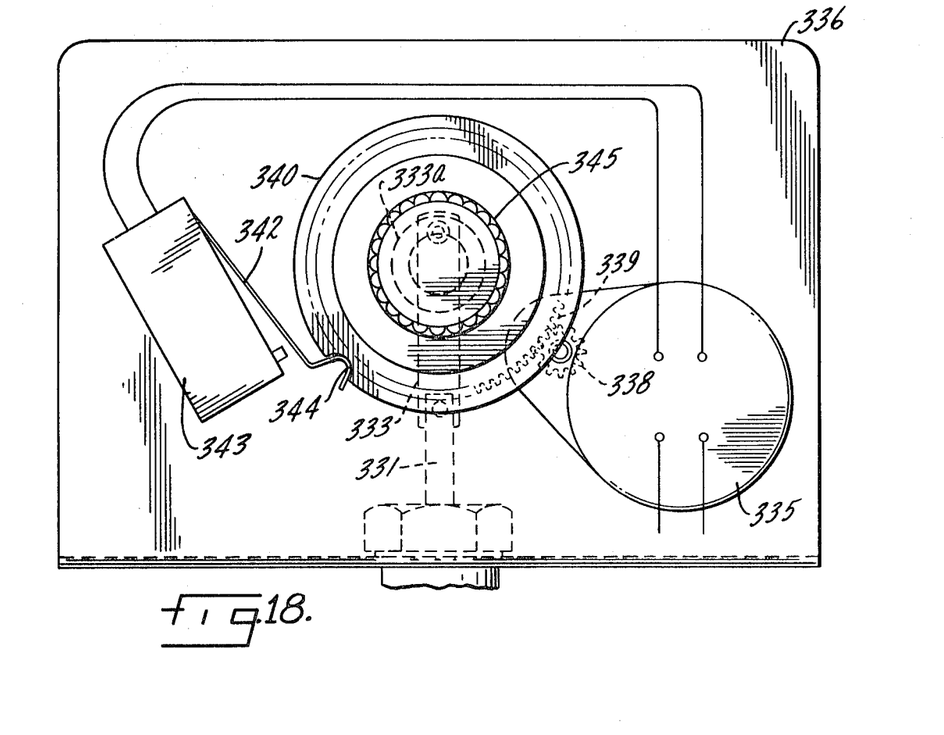
FIG. 18 illustrates another embodiment of the invention in which the same water softener valve of FIGS. 1–15 is utilized with a manually initiated and automatically stopped drive for the valve piston.

FIG. 18 discloses another embodiment of the invention in which the same valve of FIGS. 1–17 is employed and in which a drive is used to slowly and continuously move the valve operating piston through the successive regenerative positions aforementioned. In FIG. 18, the valve piston movement is continuous, once started, and automatically stopped when regeneration is finished. Initiation of the piston movement regeneration cycle is brought about a manual starting operation. The piston movement, once started, is time controlled to the extent that a synchronous motor drives the piston over that time interval necessary for a complete reciprocating cycle.

In FIG. 18, for example, piston rod 331 is adapted to be reciprocated by the connecting rod 333 which is pivotally connected to a crank 333a which is fixed to gear 339 which is adapted to be rotated by pinion 338. A synchronous motor and transmission assembly 335 rotates gear 338. Transmission assembly 335 is mounted on a panel 336 as in the other figures. Gear 339 is journalled for rotation in the panel. Crank 333a, which is defined by a hub of gear 339, may be on one side of the panel 336 while gear 339 is on the other side thereof.

In FIG. 18 the synchronous motor 335 of the gear and transmission assembly is normally deenergized. Energization is effected by rotation of a switch operating cam 340 which moves a switch actuating arm 342 of a normally open switch 343 to a closed position. Cam 340 has a cut-out portion 344 in the periphery thereof so that the switch actuating arm 342 may rest in this cut-out portion when the cam is in the position illustrated in FIG. 18. This is the normal open position of the switch and the deenergized condition of motor 349. Cam 340 is fixed to gear 339 for rotation therewith. When cam 340 is rotated through a partial revolution as by means of the manual actuating knob 345, the normal circular periphery of the cam 340 moves the switch actuating arm 342 to the closed position and energization of the motor 349 is started. This rotates gear 339 through one complete revolution. At the same time cam 340 is rotated through a complete revolution. After approximately one complete revolution of cam 340, switch arm 342 drops into the cut-out portion 344 to open switch 343 and motor 349 stops. This is the normal service position of the valve.

It should be understood that a suitable cover or housing (not shown) may overlie the mechanism shown in FIG. 18 while leaving the actuating knob exposed to the user.

As in the case of FIGS. 1–17, movement of the valve operating piston is continuous. It moves slowly through the successive positions necessary for backwashing, brining and rinsing before the normal service position is reached, as described with respect to the other figures.

Whereas I have shown and described an operative form of the invention, it should be understood that this showing and description thereof should be taken in an illustrative or diagrammatic sense only. There are modifications to the invention which will fall within the scope and spirit thereof and which will be apparent to those skilled in the art. The scope of the invention should be measured only by the scope of the hereinafter appended claims.

I claim:

1. A water softener valve including a valve body having inlet, outlet, drain, tank connecting, and brining passages therein, said valve having a slidable piston therein movable to various positions within the valve to connect said passages for normal service, backwashing, regeneration, and brine tank filling stages, a drive motor and crank means operable by the motor for shifting said piston through said positions, switch means for energizing said motor, timing means for periodically actuating said switch means to thereby energize said motor and cause movement of said piston within said valve, and means operable in synchronized relation with the movement of said piston for holding said switch means in motor energizing position continuously until said drive motor moves said piston through said various positions and returns to a normal stationary position, said means being operable thereafter to deactivate said switch means.

2. The structure of claim 1 wherein said crank means includes a rotatable element driven by said motor and said last named means includes a rotatable switch actuating cam, said switch actuating cam being formed to hold said switch in motor energizing position during one revolution of said rotatable element.

3. The structure of claim 1 wherein said switch means is formed as a single switch with an actuating lever, said last named means including an element driven with said crank means and engageable with said actuating arm, and said timing means includes a timing motor and a clutching element periodically shiftable in response to rotation of said timing motor, said clutching element including lugs positioned to engage said actuating arm and initially close said switch.

4. The structure of claim 1 wherein said drive motor includes a drive gear engageable with a driven gear carried by said crank and said motor and drive gear are swingably mounted on said frame for movement into and out of a position of engagement with said driven gear, and spring means releasably bias said motor and drive gear into said position.

5. A water softener valve of the reciprocating piston operated type including a valve body having hard water inlet and service outlet ports positioned adjacent to one another in spaced relation and communicating with a valve bore, said valve body including tank connecting ports positioned on opposite sides of said inlet and outlet ports and being connectable to the top and bottom of a water softening tank, one of said tank connecting ports being adjacent to said inlet port and the other of said tank connecting ports being adjacent to said outlet port, said valve body having a first aspirating passage positioned adjacent to said inlet port and a second passage for feeding hard water to said aspirating passage in communication with said inlet port, said valve body having a drain port opening into said bore at a position axially spaced from said other ports, and an operating piston positioned in and axially movable along said valve bore, said piston and valve bore including cooperating sealing means for closing off said inlet and outlet passages from one another in one normal position of said piston while establishing normal service communication between said tank connecting ports and said inlet and outlet ports, said sealing means being effective in another axial position of said piston to connect said inlet port and outlet port while connecting said one of said tank connecting ports to said drain port for a brine and rinse operation while the other of said tank connecting ports is connected to said first aspirating passage, the axial spacing of said ports and seal means being such that when said piston moves from said normal position to said second position and then returns, flow direction through said tank is first changed by connection of said inlet port to said one tank port accompanied by connection of said drain port to said other tank port for a preselected increment of piston movement for a backwashing operation, is then again changed by connection of said one tank connecting port to said drain port accompanied by connection of said other port to said aspirating passage for a preselected increment of piston movement for a brining and partial rinsing operation, and is again changed by connection of said inlet port to said one tank port accompanied by connection of said other tank port to said drain port for a final rinsing operation corresponding to a preselected additional increment of piston movement, said inlet and outlet ports being in constant communication during said increments of movement until just prior to the time that said piston returns to said normal position.

6. The structure of claim 5 wherein said piston has a bore extending axially therethrough, and said valve bore and piston have cooperating sealing surfaces between said drain port and said other port, said piston bore being in communication with said one tank port and said drain port when said piston is in brine and rinse positions, said sealing surfaces being effective to seal said drain port and said other port from one another in said normal position and in said brine and rinse position while allowing communication therebetween in other positions.

7. The structure of claim 5 wherein said inlet port, outlet port, other tank connecting port and drain port are equally spaced along the axis of said valve body.

8. The structure of claim 7 wherein said piston has first and second flow grooves in the periphery thereof, the first groove having an axial dimension greater than the spacing of two adjacent ports and spanning said inlet and outlet ports when said piston is in said second position, said second groove having an axial dimension greater than the axial dimension of a seal ring between said drain port and said other tank connecting port.

9. The structure of claim 5 wherein said other tank connecting port and said first aspirating passage are generally aligned longitudinally of said valve bore and said drain port has flow restrictor means associated therewith whereby a pressure is maintained against said first aspirating passage when said other of said tank connecting ports is connected to said drain to thereby prevent flow of brine through said first aspirating passage during said backwashing operation and final rinsing operation.

10. The structure of claim 5 characterized by and including drive means for periodically continuously moving said piston from said normal position to said second position and then back to said normal position.

11. In a piston type water softener valve having inlet, outlet, drain and tank connecting ports spaced along the axis of a valve body and selectively communicating with one another through a bore in said body under control of a piston which is movable axially of the body, the improvement comprising time controlled operating mechanism for periodically slowly moving the piston continuously from a first position in said bore and to a second position spaced from said first position and then back to said first position, the inlet and outlet ports being positioned adjacent to one another along the axis of the bore in said body and with tank connecting ports positioned on opposite sides of said inlet and outlet ports, said piston and bore having cooperating sealing surfaces positioned to enable communication between the hard water inlet port and one of said tank connecting ports and communication between said service outlet port and said other tank connecting port in said one position of said piston while sealing said inlet and outlet ports from one another, said surfaces being also positioned to enable communication between said hard water inlet port and said service outlet port in said other position of said piston, and while sealing said inlet port from said one tank port, said piston and valve bore having cooperating sealing surfaces positioned to establish communication between said other tank connecting port and a drain connection in positions intermediate said first and second position, said valve body including an aspirator opening into said bore and communicating with said hard water inlet and said other port in said second position, the cooperating sealing means of said valve bore and said piston being effective to maintain the communication between said hard water inlet port and said service outlet port during a range of movement of said piston toward said second position and during a range of movement of said piston from said second position toward said first position.

12. The structure of claim 11 wherein said piston includes a pair of annular grooves formed therein and lands which cooperate with seal rings in said valve bore between said passages for defining said seal means.

13. The structure of claim 11 wherein said piston includes a pair of spaced grooves formed therein and sealing lands between said grooves for cooperation with seal rings between said ports in said valve body, one of said grooves being positioned to establish communication between said inlet and outlet ports in said second position of said piston and the other of said grooves being positioned to establish communication between said drain port and said other tank port in said intermediate positions of said piston.

14. The structure of claim 11 wherein said valve bore has seal means between said outlet port and said other tank port, and said piston has a surface cooperable with said seal means in said second and intermediate positions to seal said outlet port from said other tank port, said surface being positioned away from said seal ring during a range of movement of said piston toward and away from said second and intermediate positions, said sealing surfaces between the inlet and outlet port being out of engagement during said range of movement.

15. The structure of claim 11 wherein said piston is driven by a rotatable crank and said crank is rotated by a motor, said time controlled mechanism including means for periodically causing said motor to rotate said crank continuously through a full revolution.

16. The structure of claim 11 wherein said piston is driven by a rotatable crank and said crank is rotated by a periodically energized motor and time controlled mechanism for periodically energizing said motor to drive said crank through a complete revolution, said mechanism including a switch actuating cam driven with said crank and a switch controlled by said cam for energizing and deenergizing said motor, said time controlled mechanism also including means for periodically initially actuating said switch for energizing said motor.

17. The structure of claim 11 wherein said piston is driven by a rotatable crank and said crank is rotated periodically by a continuously running timing motor, and timing means are provided for periodically causing a driving engagement between said timing motor and crank to rotate said crank through a full revolution.

18. The structure of claim 17 wherein said timing motor continuously rotates a time indicating wheel, and said crank includes a peripheral surface positioned to be driven by a gear continuously rotated by said timing motor, said surface having a gap in the periphery thereof which when opposed to said gear breaks the drive between said gear and said crank, said crank including an actuating element adapted to move said crank through a partial revolution during each revolution of said wheel to cause engagement between said gear and surface to drive said crank through movement sufficient to move said gap away from opposed relation to said gear.

19. A water softener valve including a valve body having inlet, outlet, drain, tank connecting, and brining passages therein, said valve having a slidable piston therein movable to various positions within the valve to connect said passages for normal service, backwashing, regeneration, and brine tank filling stages, a drive motor and crank means operable by the motor for shifting said piston through said positions, a wheel continuously driven by a gear train from said motor and formed and adapted for one full revolution during a predetermined time interval, said crank means including a peripheral surface opposed to a gear in said gear train, said peripheral surface having a recess formed in a portion thereof which when opposed to said gear breaks the driving connection between said gear and said crank, an actuating arm fixed to said crank for rotation therewith, and means driven by said wheel for engaging said arm and causing a partial revolution of said arm during each revolution of said wheel whereby said crank is angularly shifted by said arm once during each revolution of said wheel so as to shift said gap away from said gear and cause a driving engagement between said gear and said crank until said gap is again opposed to said gear.

20. The structure of claim 19 wherein said means includes a pin on said wheel and a second wheel positioned adjacent to said first named wheel, said second wheel having a plurality of peripherally spaced lugs positioned thereon and adapted for contact by said pin, said second wheel also having pins thereon engageable with said arm for causing a partial revolution of said arm when said second wheel is moved by said pin.

21. A water softener valve including a valve body having inlet, outlet, drain, tank connecting, and brining passages therein, said valve having a slidable piston therein movable to various positions within the valve to connect said passages for normal service, backwashing, regeneration, and brine tank filling stages, a drive motor and drive means operable by the motor for shifting said piston through said positions, means for initating operation of said drive means by said motor for shifting said piston away from said service position, and means operable in synchronized relation with the movement of said piston for continuing operation of said piston by said drive motor unitil said drive motor continuously moves said piston through said various positions and returns to a normal stationary service position, said last named means being operable thereafter to discontinue the driving of said piston by said motor.

22. The structure of claim 21 wherein said drive means includes a rotatable element driven by said motor and said last named means includes a rotatable switch actuating cam, said switch actuating cam being formed and adapted to hold an energizing switch for said drive motor in a motor energizing position during one revolution of said rotatable element and to deenergize said motor thereafter.

23. The structure of claim 21 wherein said initiating means includes a continuiusly operated timing motor and means operated thereby for periodically engaging a drive between said timing motor and said drive means.

24. The structure of claim 21 wherein said initiating means includes a continuously operable timing motor and switch means periodically operable by said timing motor to energize said drive motor for operation of said drive motor to move said piston through said various positions and to said normal inactive position.

25. The structure of claim 21 wherein said initiating means includes a time of day wheel and a timing motor means for continuously rotating said time of day wheel, said timing motor being said drive motor, said time of day wheel including a lug periodically engageable with a clutching element during rotation of said time of day wheel to cause a partial revolution of a rotatable drive element forming a part of said drive means, said rotatable drive element being adapted for rotation by a pinion driven by said drive motor and including a cut-out portion adapted when opposed to said pinion to prevent rotation of said element.

26. The structure of claim 21 wherein said valve passages are arranged in said valve body so that said piston connects said passages for a backwashing stage during a predetermined range of movement of said piston away from said service position and connects said passages for a regeneration stage during a further increment of movement away from said service position and during an initial return increment of movement of said piston, said passages being connected for said brine tank filling stage following said initial return increment of movement.

27. The structure of claim 26 wherein said inlet and outlet passages are connected for direct passage of hard water to said outlet during substantially all of said piston movement.

References Cited

UNITED STATES PATENTS

| | | | |
|---|---|---|---|
| 1,725,110 | 8/1929 | Stickney | 210—140 |
| 2,906,332 | 9/1959 | Rosten et al. | 137—624.2 |
| 3,073,346 | 1/1963 | Rudelick | 137—624.13 |
| 3,249,122 | 5/1966 | Fleckenstein et al. | 137—625.29 |
| 3,302,467 | 2/1967 | Prosser | 74—3.5 |
| 3,307,581 | 3/1967 | Rudelick | 137—625.29 |
| 3,482,604 | 12/1969 | Fleckenstein et al. | 137—624.2 |

ROBERT G. NILSON, Primary Examiner

U.S. Cl. X.R.

137—625.29; 210—140, 278